(12) United States Patent
Cecil

(10) Patent No.: US 11,449,659 B2
(45) Date of Patent: Sep. 20, 2022

(54) LITHOGRAPHY-BASED PATTERN OPTIMIZATION

(71) Applicant: Synopsys, Inc., Mountain View, CA (US)

(72) Inventor: Thomas Cecil, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 380 days.

(21) Appl. No.: 16/868,298

(22) Filed: May 6, 2020

(65) Prior Publication Data

US 2020/0379344 A1    Dec. 3, 2020

Related U.S. Application Data

(60) Provisional application No. 62/856,174, filed on Jun. 3, 2019.

(51) Int. Cl.
  *G06F 30/30*   (2020.01)
  *G06F 30/398*  (2020.01)
  *G06F 30/39*   (2020.01)
  *G06F 119/18*  (2020.01)

(52) U.S. Cl.
  CPC .......... *G06F 30/398* (2020.01); *G06F 30/39* (2020.01); *G06F 2119/18* (2020.01)

(58) Field of Classification Search
  None
  See application file for complete search history.

(56) References Cited

U.S. PATENT DOCUMENTS

| 6,957,409 B1 * | 10/2005 | Teig | G06F 30/394 |
| | | | 716/130 |
| 7,069,531 B1 * | 6/2006 | Teig | G06F 30/394 |
| | | | 716/134 |

OTHER PUBLICATIONS

M. Sato et al., "Stick Diagram Extraction Program SKELETON," 1988 IEEE, pp. 318-321. (Year: 1988).*
H.-Y. Su et al., "A Novel Fast Layout Encoding Method for Exact Multilayer Pattern Patching with Prufer Encoding," IEEE Trans. on Computer-Aided Design of Integrated Circuits and Systems, vol. 34, No. 1, Jan. 2015, pp. 95-108. (Year: 2015).*

* cited by examiner

*Primary Examiner* — Leigh M Garbowski
(74) *Attorney, Agent, or Firm* — Patterson + Sheridan, LLP

(57) ABSTRACT

An example is a method. An electronic representation of a design of an integrated circuit to be manufactured on a semiconductor die is obtained. The design of the integrated circuit includes layers. The electronic representation includes initial polygons. Polygon topological skeletons of the initial polygons of the target layer are generated. A space topological skeleton in a space between the polygon topological skeletons is generated. A connected network comprising network edges is generated. Each network edge is connected between a respective polygon topological skeleton and the space topological skeleton. A transformation of the polygon topological skeletons is performed, by one or more processors, based on the network edges, a spacing specification for a spacing between polygons, and respective specified widths associated with the initial polygons by perturbing the polygon topological skeletons.

20 Claims, 8 Drawing Sheets

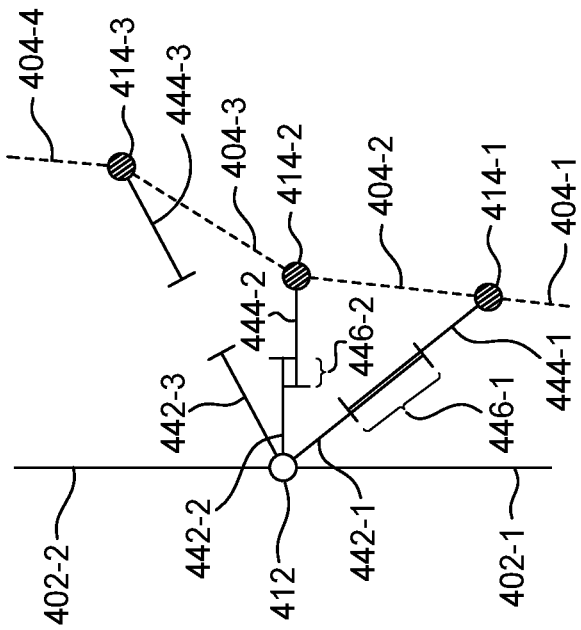
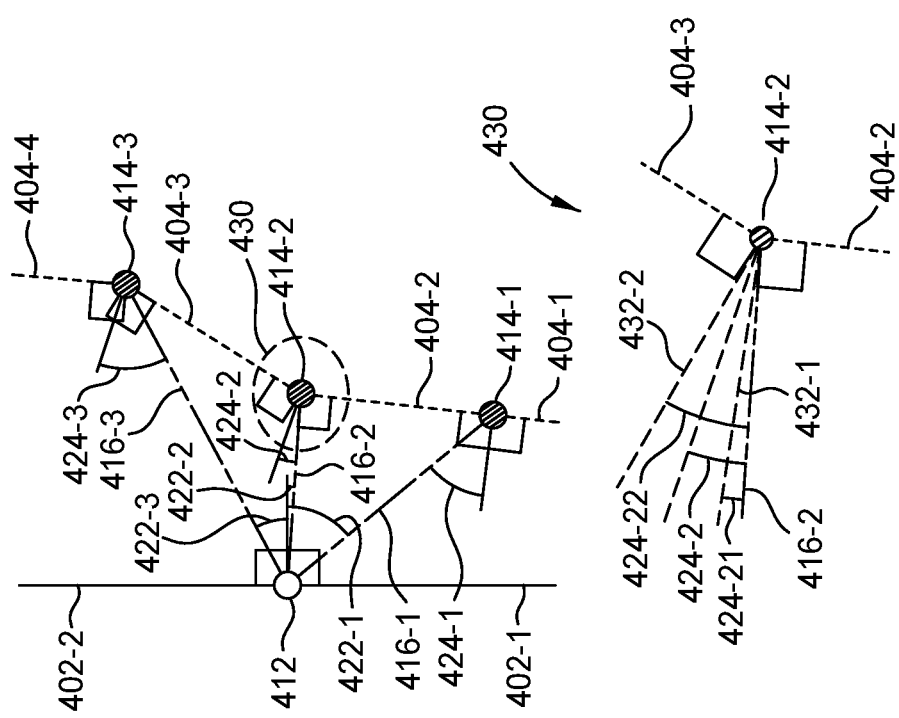
FIG. 5B
FIG. 5A

LITHOGRAPHY-BASED PATTERN OPTIMIZATION

CROSS-REFERENCE TO RELATED APPLICATIONS

This application claims priority to and the benefit of U.S. Provisional Patent Application Ser. No. 62/856,174, entitled "Network Based Chip Design Optimization," filed Jun. 3, 2019, which is incorporated herein by reference in its entirety.

TECHNICAL FIELD

The present disclosure relates to integrated circuit design optimization, and more particularly, to lithography-based pattern optimization of patterns in the integrated circuit design.

BACKGROUND

As feature sizes in integrated designs are shrinking and density of those features is increasing faster than lithography manufacturing capabilities are increasing, the semiconductor manufacturing industry is faced with cases where some designs may be difficult or impossible to manufacture, even if those designs meet suggested design rules. It also may be difficult to completely characterize what is and is not manufacturable in a set of design rules. Thus, there may be the situation where a simulation based experiment was used to determine what can be designed, but that experiment may not have been accurate at the time that the design rules have been published, thus leading to manufacturing difficulties.

Another situation which can drive the need for manufacturing-time design modification is the drive for increased yield at the expense of exact design production in the fab. It may be possible that the design can be altered slightly to improve yield at the expense of a more complicated produced layout or a layout which does not exactly match the drawn design. Certain design tools (e.g., Target Optimized ILT, (TOP-ILT)) may perform polygon edge perturbations/shifting to achieve this type of end result. However, these tools have their own accompanying challenges and problems.

SUMMARY

An example is a method. An electronic representation of a design of an integrated circuit to be manufactured on a semiconductor die is obtained. The design of the integrated circuit includes layers. The electronic representation includes initial polygons in a target layer of the layers. Polygon topological skeletons of the initial polygons of the target layer are generated. A space topological skeleton in a space between the polygon topological skeletons is generated. A connected network comprising network edges is generated. Each network edge is connected between a respective polygon topological skeleton and the space topological skeleton. A transformation of the polygon topological skeletons is performed, by one or more processors, based on the network edges of the connected network, a spacing specification for a spacing between polygons, and respective specified widths associated with the initial polygons by perturbing the polygon topological skeletons.

In the above method, generating the polygon topological skeletons can include generating first polygon topological skeleton (PTS) nodes connected by PTS edges based on the initial polygons of the target layer. Further, in the above method, generating the polygon topological skeletons can include: deriving second PTS nodes from connections to one or more layers that are underlying or overlying the target layer, each second PTS node having a placement constraint relating to the corresponding one or more layers; and inserting the second PTS nodes into the polygon topological skeletons, each second PTS node being connected by a respective one or more PTS edges to another PTS node. Even further, in the above method, generating the polygon topological skeletons can include, after generating the first PTS nodes, inserting third PTS nodes into the polygon topological skeletons, each third PTS node being connected by a respective one or more PTS edges to another PTS node, the first PTS nodes and the third PTS nodes having no placement constraint within the target layer.

In the above method, the polygon topological skeletons can include PTS nodes connected by PTS edges; the space topological skeleton can include space topological skeleton (STS) nodes connected by STS edges; and each network edge of the connected network can be connected to a respective one of the PTS nodes and a respective one of the STS nodes. Further, in the above method, each PTS node can have a specified width associated with a corresponding initial polygon of the target layer; performing the transformation can be included in performing a minimization function on a cost function, performing the minimization function on the cost function perturbs at least some of the PTS nodes when the cost function is not minimized; and the cost function can include a sum of overlap of a respective polygon distance and a space distance projected onto each network edge. The respective polygon distance can be based on the specified width of the PTS node to which the respective network edge is connected and is projected onto the respective network edge from the PTS node to which the respective network edge is connected, and the space distance can be based on the spacing specification and is projected onto the respective network edge from the STS node to which the respective network edge is connected.

The above method can further include, after performing the transformation of the polygon topological skeletons by perturbing the polygon topological skeletons, transforming the polygon topological skeletons to resulting polygons in the target layer.

In another example, a system includes a memory storing instructions, and one or more processors, coupled with the memory and configured to execute the instructions. The instructions, when executed by the one or more processors, cause the one or more processors to: generate polygon topological skeletons based on initial polygons of a target layer in an electronic representation of a design of an integrated circuit to be manufactured on a semiconductor die, generate a space topological skeleton based on a space region between the polygon topological skeletons, generate a connected-node network including network edges, and perform a minimization function on a cost function. The design of the integrated circuit includes layers that include the target layer. The polygon topological skeletons include PTS nodes connected by PTS edges. The space topological skeleton include STS nodes connected by STS edges. Each network edge is connected to a respective one PTS node and a respective one STS node. Performing the minimization function being configured to perturb the PTS nodes until an end condition of the minimization function is reached. The cost function is based on the network edges, a spacing specification for a spacing between polygons, and respective specified widths associated with the PTS nodes connected to the network edges.

In the above system, the PTS nodes can include first PTS nodes generated based on the initial polygons of the target layer, where the first PTS nodes have no placement constraint within the target layer. Further, in the above system, the PTS nodes can include second PTS nodes each generated based on a connection to a layer underlying or overlying the target layer, where each second PTS node has a placement constraint relating to the corresponding layer underlying or overlying the target layer. Even further, in the above system, the PTS nodes can include third PTS nodes arbitrarily inserted into the polygon topological skeletons, where the third PTS nodes have no placement constraint within the target layer.

In the above system, each PTS node can have a specified width associated with a corresponding initial polygon of the target layer. Further, in the above system, the cost function can include a sum of overlap of a respective polygon distance and a space distance projected onto each network edge. The respective polygon distance can be based on the specified width of the PTS node to which the respective network edge is connected and is projected onto the respective network edge from the PTS node to which the respective network edge is connected, and the space distance can be based on the spacing specification and is projected onto the respective network edge from the STS node to which the respective network edge is connected.

In the above system, the instructions, when executed by the one or more processors, further can cause the one or more processors to: after performing the minimization function, transform the polygon topological skeletons to resulting polygons in the target layer.

Another example is a non-transitory computer readable medium. The non-transitory computer readable medium includes stored instructions, which when executed by one or more processors, cause the one or more processors to: generate polygon topological skeletons based on initial polygons of a target layer in an electronic representation of a design of an integrated circuit, generate a space topological skeleton between the polygon topological skeletons, generate a connected-node network including network edges, and perform a minimization function on a cost function configured to perturb PTS nodes of the polygon topological skeletons until an end condition of the minimization function is obtained. The design of the integrated circuit includes layers that include the target layer. The polygon topological skeletons include the PTS nodes. The space topological skeleton include STS nodes. Each network edge is connected to a respective one PTS node and a respective one STS node. The cost function includes a sum of overlap of a respective polygon distance and a space distance projected onto each network edge. The respective polygon distance is based on a specified width associated with the PTS node to which the respective network edge is connected and is projected onto the respective network edge from the PTS node to which the respective network edge is connected, and the space distance is based on a spacing specification and is projected onto the respective network edge from the STS node to which the respective network edge is connected.

In the above computer readable medium, the PTS nodes can include first PTS nodes generated based on the initial polygons of the target layer. Further, in the above computer readable medium, the PTS nodes can include second PTS nodes each generated based on a connection to a respective layer underlying or overlying the target layer. Even further, in the above computer readable medium, the PTS nodes can include third PTS nodes arbitrarily inserted into the polygon topological skeletons. Even further, in the above computer readable medium, the first PTS nodes and third PTS nodes can have no placement constraint within the target layer, and each second PTS node can have a placement constraint relating to the corresponding layer underlying or overlying the target layer.

In the above computer readable medium, the stored instructions, which when executed by the one or more processors, can further cause the one or more processors to: after performing the minimization function, transform the polygon topological skeletons to resulting polygons in the target layer based on respective specified widths associated with the PTS nodes.

BRIEF DESCRIPTION OF THE DRAWINGS

The disclosure will be understood more fully from the detailed description given below and from the accompanying figures of examples of the disclosure. The figures are used to provide knowledge and understanding of examples of the disclosure and do not limit the scope of the disclosure to these specific examples. Furthermore, the figures are not necessarily drawn to scale.

FIGS. 5A and 5B are simplified illustrations to show aspects of determining distances and overlap for a cost function according to some examples.

DETAILED DESCRIPTION

Figure 1:
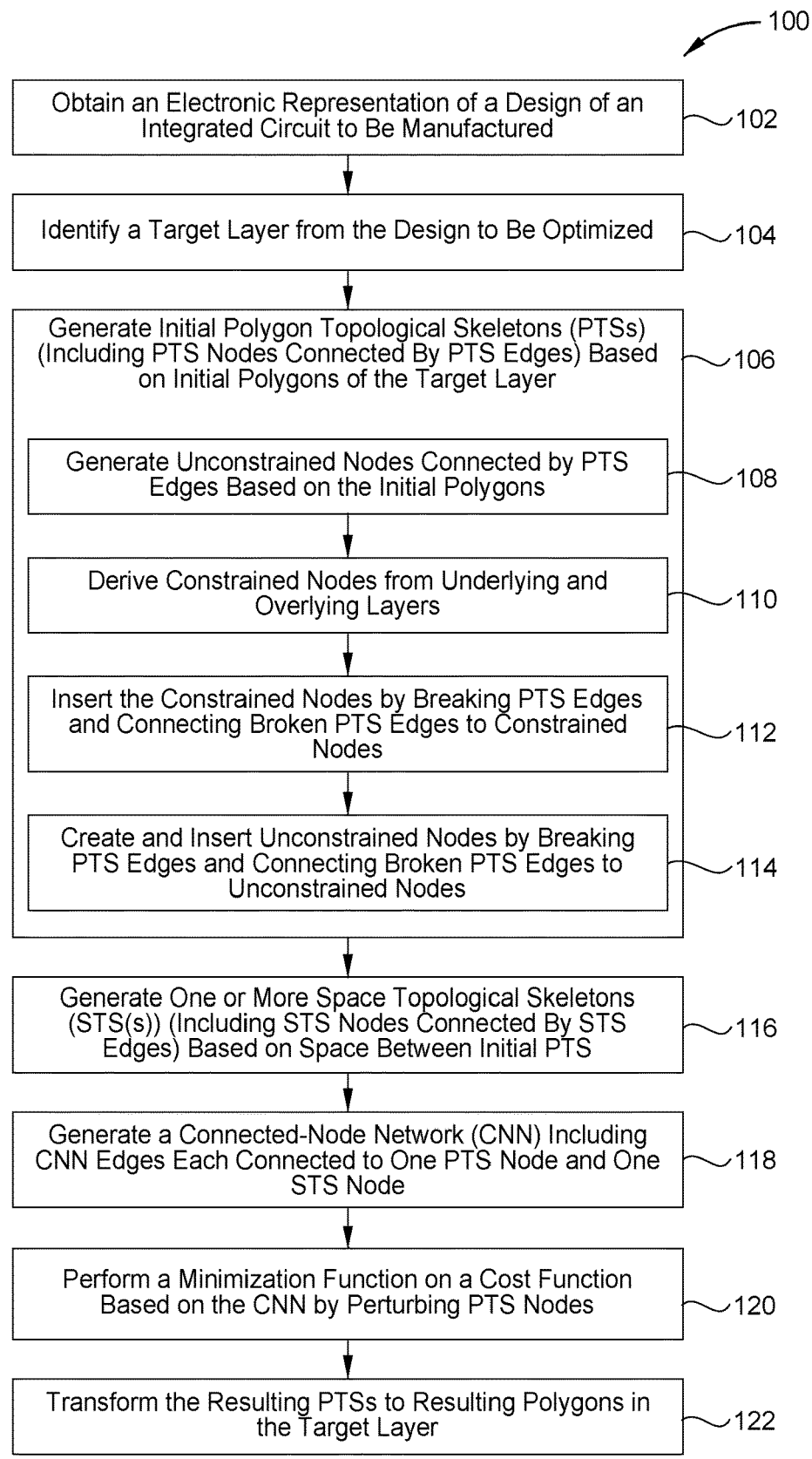
FIG. 1 is a flowchart of a method for lithography-based pattern optimization according to some examples.

Aspects of the present disclosure relate to lithography-based pattern optimization. In integrated circuit design, components of the integrated circuit to be manufactured on a semiconductor die are oftentimes represented by various polygons on layers in an electronic representation of the integrated circuit. The polygons on the layers can generally be used to generate a mask set for lithography that is to be implemented in manufacturing the integrated circuit on the semiconductor die. Designs of integrated circuits continue to push the limits of the capabilities of lithography which results in the decreasing feature size and increased density of features on the semiconductor die.

In an attempt to ensure that a design of an integrated circuit is manufacturable, various analyses (e.g., including verification and synthesis) are performed on the design before the design is taped out for manufacturing. Such analyses can be performed to ensure that features, such as metal lines in a metal layer, to be patterned on the semiconductor die using lithography as at least part of the fabrication process of those features are designed within the capabilities of the lithography. The capabilities of the lithography can be indicated by spacing specifications, such as a critical dimension, between patterns. Previous tools that performed those analyses generally analyzed the layout of polygons on layers, which required a two-dimensional analysis. The analysis was capable of adjusting edges of polygons to accommodate the capabilities of the lithography, but adjusting polygon edges adds an extra dimension to the analysis. This extra dimension increases complexity to the analysis, which further required increased processing resources and time. When an adjustment is performed on all angle features (which is what the lithography printed contours will ultimately be), the problem is forced to be solved in the two dimensional Manhattan polygon domain (e.g., the domain where the polygons were originally drawn), which can be too restrictive. Further, polygon based representations also have no concept of connectivity, length, or other more global geometry metrics.

Examples described herein transform polygons of a target layer (e.g., polygons representing metal lines in a target metal layer) of an electronic representation of a design of an integrated circuit into polygon topological skeletons (PTSs). One or more space topological skeletons (STSs) are generated in the space(s) between the PTSs. A connected-node network (CNN) is created connecting PTS nodes of the PTSs to STS nodes of the STS(s). A cost function is defined based on the CNN. For example, the cost function can be a sum of overlap projected onto each CNN edge of the CNN of specified distances extending from the respective PTS node and STS node connected to the CNN edge. The specified distances can be based on, for example, specified widths of the polygons (e.g., original widths or modified widths based on the original widths of initial polygons) and a spacing specification (e.g., a critical dimension or other amount) of the technology node at which the integrated circuit is to be manufactured on the semiconductor die. A minimization function is performed on the cost function. The minimization function can include minimizing the cost function (e.g., to obtain a local or global minimum) by perturbing PTS nodes of the PTS. The resulting PTS can then be transformed back into polygons of the target layer.

Some examples can reduce the dimensionality of analyzing compliance with capabilities of the lithography to be implemented in manufacturing the integrated circuit. Transforming the polygons into topological skeletons with nodes creates a one-dimensional problem to be analyzed, and perturbing a node, as opposed to an edge of a polygon, reduces the complexity of the analysis. Reducing the complexity reduces processing resources that are used and time for processing. Incorporating a spacing specification into an analysis of the CNN can provide a solution that is closer to a global optimum that achieves all spacing requirements between polygons. By constructing the cost function as described, many or all potential paired width, space, and/or other geometric violations can be considered simultaneously during minimizing the cost function. These and other benefits and advantages can be achieved by various examples described or contemplated herein.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed subject matter or as a limitation on the scope of the claimed subject matter. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Also, various terms are used herein as used in the art. For example, "optimizing" may refer to improving, within the structure of the algorithm implemented, some identified characteristic, and does not necessarily imply an absolute or global optimal (as the term is more colloquially used) improvement of the characteristic.

FIG. 1 is a flowchart of a method 100 for lithography-based pattern optimization according to some examples. The method 100 is described below in the context of various figures to illustrate aspects. These figures are provided merely as examples, and a person having ordinary skill in the art will readily understand application of the method 100 in other examples.

As described in further detail below, the method 100 can be embodied by one or more sets of instructions, which may be one or more software modules, stored on a non-transitory computer readable medium. One or more processors of a computer system can be configured to read and execute the one or more sets of instructions, which causes the one or more processors to perform the various operations or steps of the method 100. Further details are provided below.

Referring to the method 100 of FIG. 1, at block 102, an electronic representation of the design of an integrated circuit chip to be manufactured on a semiconductor die is obtained. The electronic representation can be in any format, such as including an OASIS file, a GDS file, or the like. The design of the integrated circuit includes a number of layers of features to be formed on a semiconductor die. For example, the layers can include a substrate layer and metal layers of an interconnect of the integrated circuit. The electronic representation includes polygons for patterning various features of the respective layers. For example, for a metal layer, polygons can represent metal lines and/or vias in the respective metal layer. Other layers can have polygons that represent other features, such as active areas (e.g., fins) for a substrate layer in which transistors are formed.

FIGS. 2A, 2B, 2C, 2D, 2E, and 2F depict various views of a design of metal layers to be manufactured in an integrated circuit according to some examples. Each of the metal layers is illustrated including metal lines and/or vias that together are designed to interconnect various devices in the integrated circuit. The illustrated example is to provide context for the method 100 of FIG. 1, and other designs and/or features can be used.

Figure 2C:
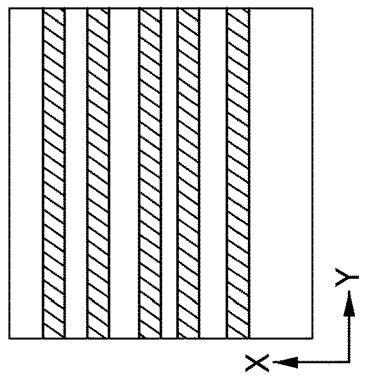
FIGS. 2A, 2B, 2C, 2D, 2E, and 2F depict various views of a design of metal layers to be manufactured in an integrated circuit according to some examples.
Figure 2F:
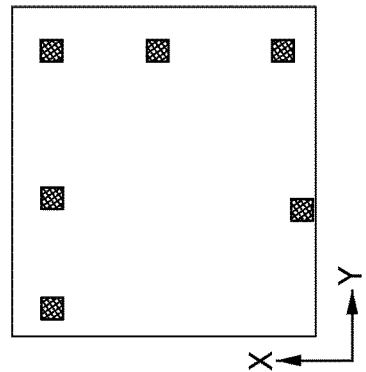
Figure 2B:
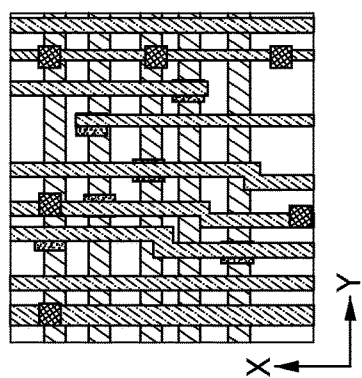
Figure 2E:
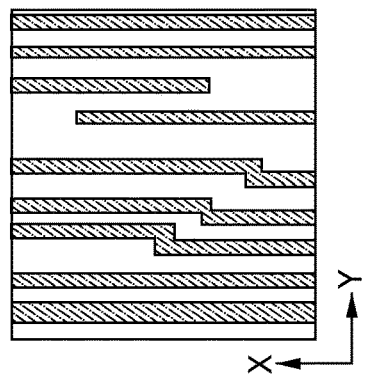
Figure 2D:
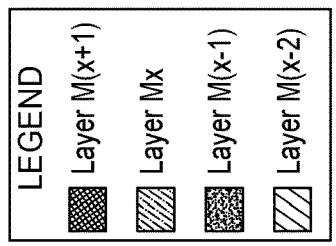
Figure 2D:
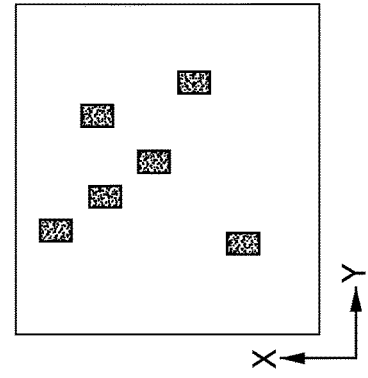
Figure 2A:
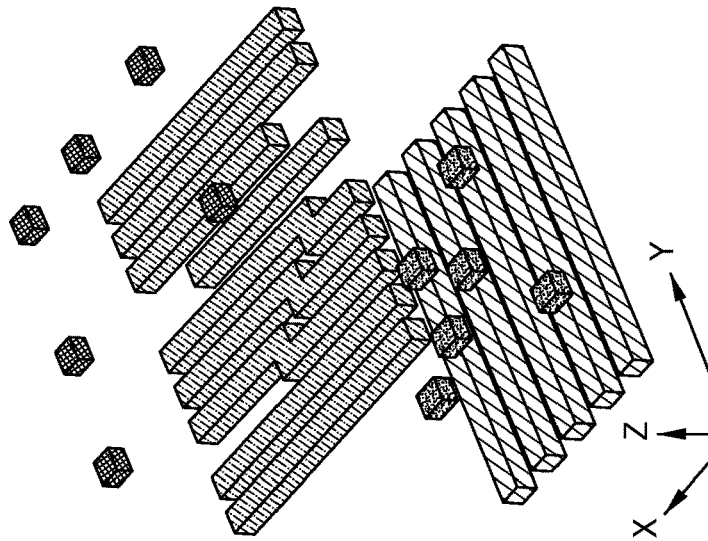

FIG. 2A depicts a three-dimensional exploded perspective view of the design of metal layers. The metal layers include metal layers M(x−2), M(x−1), Mx, M(x+1). Metal layer M(x−1) is the metal layer immediately overlying metal layer M(x−2) in the design (and to be manufactured on the semiconductor die for the integrated circuit). Metal layer Mx is the metal layer immediately overlying metal layer M(x−1) in the design, and metal layer M(x+1) is the metal layer immediately overlying metal layer Mx in the design. As illustrated, the metal layer M(x−2) includes metal lines that generally extend along a Y-direction, and the metal layer Mx includes metal lines that generally extend along an X-direction. The metal layer M(x−1) includes vias that connect respective metal lines in metal layers M(x−2), Mx (e.g., each via at an x,y location within metal layer M(x−1) connects to a metal line in metal layer M(x−2) and to a metal line in metal layer Mx, where each of the two metal lines aligns in a Z-direction with the x,y location of the via). Similarly, the metal layer M(x+1) includes vias that connect respective metal lines in metal layer Mx to a conductive feature (e.g., a metal line or via) in an immediately overlying layer (e.g., a metal layer M(x+2)), although such overlying layer is not illustrated. The metal layers illustrated in FIG. 2A can be located at any group of metal layers within the design of the integrated circuit.

FIG. 2B depicts a layout view of the design metal layers where the metal layers are overlaid and in respective x-y planes. The alignment of the various metal lines and vias in the metal layers in a Z-direction is shown by the overlaid layout of FIG. 2B. FIGS. 2C, 2D, 2E, and 2F depict a layout of metal layer M(x−2), M(x−1), Mx, M(x+1), respectively, in a respective x-y plane. The metal lines and vias in the layouts are shown by polygons corresponding to the design. For example, each metal line in metal layer M(x−2) or metal layer Mx is shown as a polygon extending longitudinally in a Y-direction or X-direction, respectively. Similarly, each via in metal layer M(x−1) or metal layer M(x+1) is shown as a polygon.

Figure 3A:
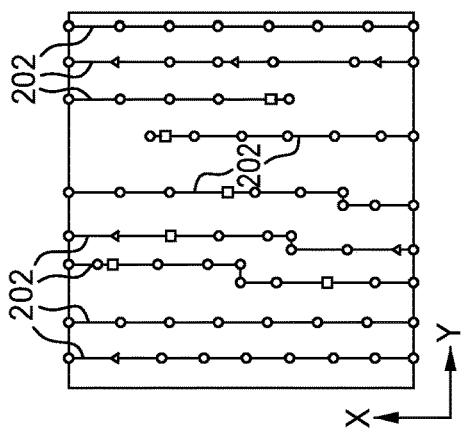
FIGS. 3A, 3B, 3C, 3D, 3E, and 3F depict various transforms and aspects of the method of FIG. 1 in the context of a metal layer of FIGS. 2A-2F according to some examples.

Referring back to the method 100 of FIG. 1, at block 104, a target layer to be optimized is identified from the design. Referring to FIG. 3A, metal layer Mx is identified as the target metal layer to be optimized. Metal layers M(x−1), M(x+1) immediately underlying and overlying the identified metal layer Mx can also be identified, such as illustrated in FIG. 3A. Such underlying and overlying metal layers M(x−1), M(x+1) can be used to determine constraints on the metal layer Mx to be optimized. Each of metal layers M(x−1), Mx, M(x+1) include initial polygons of the design representing respective metal lines or vias. Although reference is made to one layer to be optimized for clarity, examples contemplate performing processing described herein on multiple layers in parallel or by iterative processing, and/or co-optimizing multiple layers together.

Referring back to the method 100 of FIG. 1, at block 106, respective initial polygon topological skeletons (PTSs) are generated based on the initial polygons of the target layer, where each initial PTS includes PTS nodes connected (e.g., logically) by PTS edges. Generally, each PTS edge of the initial PTSs is equidistant to boundaries of the polygon from which the respective PTS edge is generated. The initial PTS can be generated using any skeleton algorithm, such as an augmented Voronoi Diagram or the like.

Generating the initial PTSs includes, at block 108, generating unconstrained nodes connected by PTS edges based on the initial polygons of the target layer. The unconstrained nodes are placed at ends of the PTS edges. Each unconstrained node permits movement of the respective node in any X and/or Y-direction within the target layer during the optimization.

Generating the initial PTSs can further include, at block 110, deriving constrained nodes from underlying and/or overlying layers, and at block 112, inserting the constrained nodes into the initial PTSs by breaking PTS edges and connecting the broken PTS edges to respective constrained nodes. Where each constrained node is inserted breaks a respective PTS edge and creates two PTS edges, each connected to the constrained node that is inserted. For example, constrained nodes corresponding to connections to features of overlying and underlying layers (e.g., metal layers) can be derived and inserted in the initial PTS, where each of the constrained nodes has a constraint to maintain such connection.

Some examples contemplate that the constrained nodes include unidirectional constrained nodes and constrained location nodes. Each unidirectional constrained node permits movement of the respective node in a direction within the target layer and prohibits movement in another direction within the target layer perpendicular to the direction in which movement is permitted. For example, a unidirectional constrained node can be permitted to be moved in an X-direction and prohibited from being moved in a Y-direction, or vice versa. In some examples, a target layer can have one or more unidirectional constrained nodes permitting movement in an X-direction and one or more unidirectional constrained nodes permitting movement in a Y-direction. A unidirectional constrained node pins or locks the node to an axis along the direction in which movement is permitted. Each constrained location node prohibits movement of the respective node in each direction within the target layer. A constrained location node pins or locks the node to the location of that node.

Other constraints can be implemented in other examples, such as range constraints that permit movement within a specified distance and not beyond that distance (which may be further constrained by a direction). In some examples where multiple metal layers are co-optimized, a constraint can be a connection constraint that aligns PTSs of different metal layers in a Z-direction. In some examples, constraints can be implemented for a collection of nodes, such as geometry constraints. For example, geometry constraints can include some constraint on the curvature of a topological skeleton formed by the nodes, some constrain on the collective length between nodes, or the like. A curvature constraint can prevent a resulting polygon and its represented feature from having too severe of a curve. A length constraint can prevent a resulting polygon and its represented feature from being too long, such as a metal line from being too long, which could increase resistance of the metal line and adversely affect electrical performance. Many other constraints can be implemented.

Figure 3C:
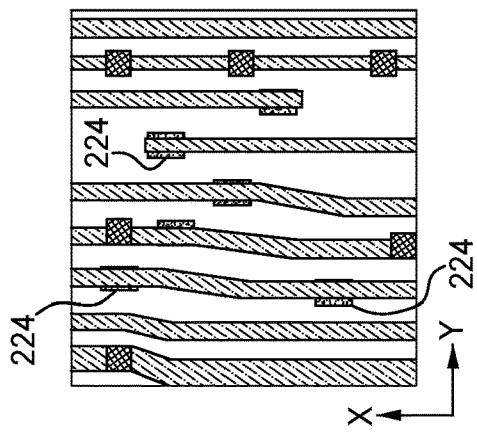
Figure 3B:
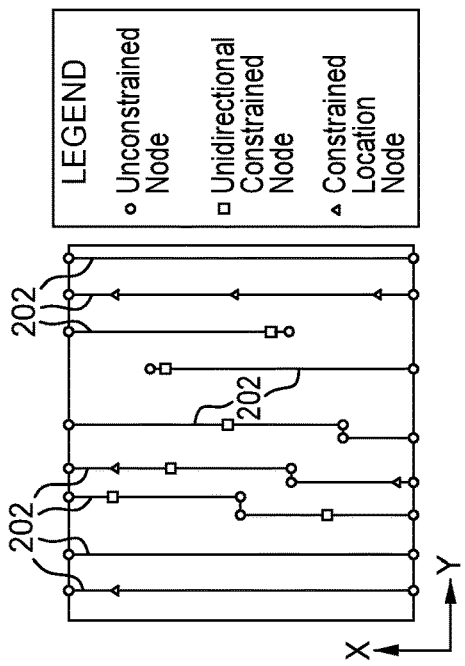
Figure 3E:
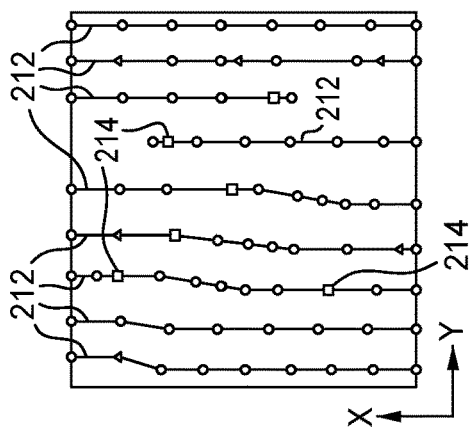

Referring to FIG. 3B, an initial PTS 202 of each polygon of metal layer Mx is generated (like in block 108 of FIG. 1), where the initial PTSs 202 include PTS nodes with PTS edges each connected between a respective pair of PTS nodes. FIG. 3B shows unconstrained nodes that are generated based on the polygons of the metal layer Mx. The generation of the initial PTSs 202 generates these unconstrained nodes connected between PTS edges.

FIG. 3B further illustrates unidirectional constrained nodes and constrained location nodes that are derived and inserted (like in blocks 110, 112 of FIG. 1) in the initial PTSs 202. In this illustrated example, the unidirectional constrained nodes are derived from polygons of vias of metal layer M(x−1). As illustrated by FIGS. 2A-E, the vias of metal layer M(x−1) connect various metal lines of metal layer Mx to metal lines of metal layer M(x−2). The metal lines of metal layer M(x−2) are illustrated to extend straight in a Y-direction without turns or bends. Hence, vias in metal layer M(x−1) can be moved along a Y-direction and maintain a proper connection to the same respective metal lines in metal layer M(x−2). However, movement of vias in metal layer M(x−1) along an X-direction can cause the vias to not be connected to the correct metal lines or to be connected to the incorrect metal lines in metal layer M(x−2). Hence, unidirectional constrained nodes are derived from the vias of metal layer M(x−1), where the unidirectional constrained nodes are permitted to move along a Y-direction and prohibited from movement along an X-direction. Further in this example, it is assumed that the vias of metal layer M(x+1) cannot be moved, such as due to some static feature overlying metal layer M(x−1) and/or turns or bends in metal lines of metal layer M(x+2). Hence, constrained location nodes are derived from the vias of metal layer M(x+1), where the constrained location nodes are prohibited from moving in each direction. As indicated by the foregoing, the PTS nodes include unconstrained nodes, unidirectional constrained nodes, and constrained location nodes in this example.

Referring back to the method 100 of FIG. 1, generating the initial PTSs can further include, at block 114, creating and inserting additional unconstrained nodes into the initial PTSs by breaking PTS edges and connecting the broken PTS edges to respective unconstrained nodes. Any number of unconstrained nodes can be inserted. Where each unconstrained node is inserted breaks a respective PTS edge and creates two PTS edges, each connected to the unconstrained node that is inserted. Insertion of the additional unconstrained nodes can permit finer and more precise perturbation of the PTSs during the optimization. However, increasing the number of unconstrained nodes can adversely affect complexity (e.g., increase complexity) and processing time of the optimization. Hence, the number or resolution of the additional unconstrained nodes inserted in the PTSs can be selected to balance a desired precision of perturbation with complexity and processing time.

FIG. 3C shows the insertion (like in block 114 of FIG. 1) of additional unconstrained nodes in the initial PTSs 202 shown in FIG. 3B. The number of additional unconstrained nodes, locations of insertion in the initial PTSs 202, and distance between neighboring pairs of PTS nodes in the initial PTSs 202 can be arbitrary.

Each PTS node that is generated and/or inserted has associated data corresponding to the initial polygon represented by the initial PTS. For example, each PTS node maintains data indicating a location of the respective node in the x-y plane of the target layer, indicating which PTS edge and/or other node(s) the respective node is connected in the initial PTS, indicating one or more specified widths (e.g., the original width, a modified width based on the original width, and/or a target width) of the polygon from which the PTS node and corresponding PTS edge in the initial PTS were generated, and indicating any constraints of the respective PTS node. Other data can be associated with a PTS node, such as any other local geometric specification information and any local lithography specifications for the PTS node. If a PTS node is created (e.g., derived from a connection to an overlying or underlying layer or arbitrarily created) and inserted into the initial PTSs, data, such as indicating the width of the initial polygon or any other specified width, can be copied from a PTS node connected to a PTS edge broken by the insertion of the inserted PTS node. Maintaining such data with the PTS nodes permits subsequent construction of resulting polygons in the target layer following optimization. Example constraints relating to movement within the x-y plane of the target layer have been described above, and in further examples, other constraints may be implemented in addition to or instead of these constraints. For example, other constraints can include geometric constraints, such as length, curvature, the like, or a combination thereof of the associated polygon.

Referring back to the method 100 of FIG. 1, at block 116, one or more space topological skeletons (STSs) are generated based on the space between the initial PTSs, where the STS(s) includes STS nodes and STS edges connected between a respective pair of STS nodes. Generally, each STS edge of the STS is equidistant to the initial PTSs that define boundaries of the space from which the respective STS edge is generated. The STS can be generated using any skeleton algorithm, such as an augmented Voronoi Diagram or the like. Unconstrained nodes are placed at ends of each STS edge. Any number of unconstrained nodes can be inserted or generated into the STSs, like described above with respect to the initial PTSs.

Figure 3D:
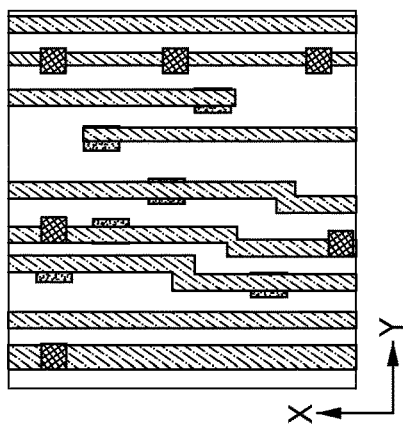

FIG. 3D shows the generation of STSs 204 of the space between the initial PTSs 202 shown in FIG. 3C (like in block 116 of FIG. 1). For clarity, explicit depiction of unconstrained nodes of the STSs 204 is omitted.

Referring back to the method 100 of FIG. 1, at block 118, a connected-node network (CNN) is generated, where the CNN include CNN edges each connected to a respective one PTS node of the initial PTSs and a respective one STS node of the STSs. Each PTS node of the initial PTSs can be connected to multiple CNN edges of the CNN, and similarly, each STS node of the STS(s) can be connected to multiple CNN edges of the CNN. The CNN can be generated by connecting, via a CNN edge, a respective STS node of the STSs to each PTS node of the initial PTSs that contributes to the placement at the location of the respective STS node of the STS(s) (e.g., contributes above some threshold amount) during the generation of the STS(s).

Figure 4A:
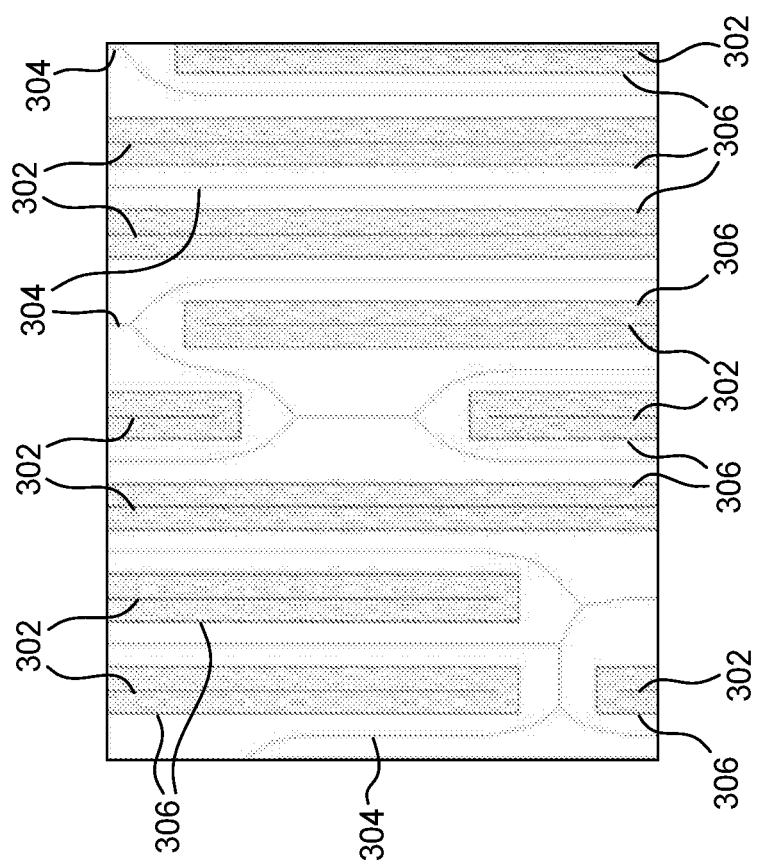
FIGS. 4A and 4B illustrate an example of generation of a connected-node network according to some examples.
Figure 4B:
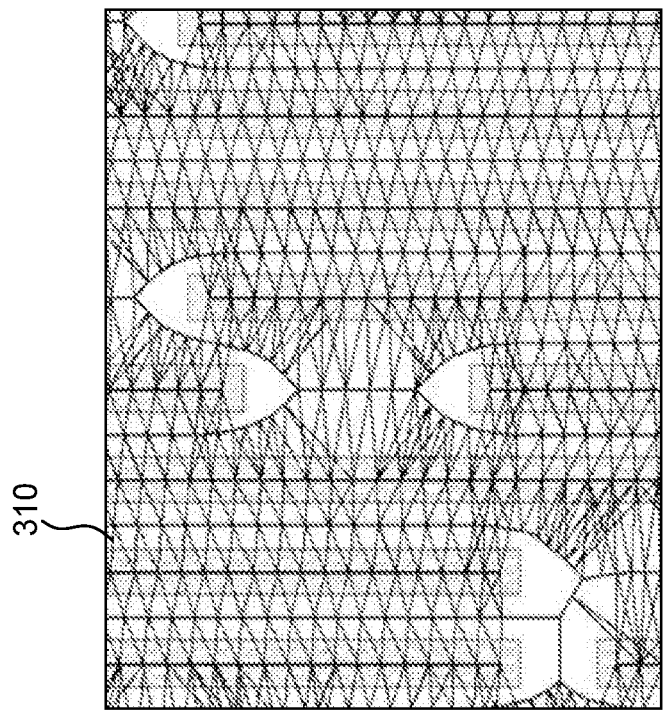

FIGS. 4A and 4B illustrate an example of generation of a CNN (like in block 118 of FIG. 1). FIG. 4A shows initial PTSs 302, a STS 304, and the initial polygons 306 of the metal lines. FIG. 4B shows the CNN 310 connecting PTS nodes of the initial PTSs 302 and STS nodes of the STS 304. For clarity, the nodes of the initial PTSs 302 and the STS 304 are not explicitly illustrated in FIGS. 4A and 4B.

Referring back to the method 100 of FIG. 1, at block 120, a minimization function is performed on a cost function that is based on the CNN. Performing the minimization function on the cost function can include minimizing the cost function by performing a transformation on the PTSs, such as by perturbing PTS nodes of the initial PTSs (e.g., as permitted by constraints) until an end condition of the minimization function is obtained. In some examples, the cost function is a sum, for all of the CNN edges of the CNN, of overlap of respective defined distances extending from a PTS node and a STS node connected by a respective CNN edge of the CNN and projected onto the respective CNN edge. An end condition of the minimization function can be when the cost function is minimized to obtain, e.g., a local or global minimum of the cost function, or the minimization function times out without obtaining a solution.

The distance from any node is based on a specified width (e.g., an original width, a modified width based on the original width, and/or a target width) of a polygon that is associated with the node and/or on a spacing specification (e.g., a critical dimension specified by a technology node at which the integrated circuit is to be manufactured or some other amount, e.g., to increase a processing window). A specified width can be the original width of the initial polygon (e.g., if the original width is to be maintained) or some other modified or target width (e.g., to enforce a larger width on a polygon relative to the original width of the polygon). The spacing specification can be a same dimension for each node or can vary among different nodes. Different dimensions of the spacing specification for different STS nodes can permit different spacings between polygons. The distance for any PTS node of the initial PTSs can be based on or can be half of the specified width of the polygon that is associated with the PTS node, and the distance for any STS node of the STSs can be based on or can be half of the spacing specification (which may be the same or different for different STS nodes).

In some examples, the distance for a node can be a scaled amount of half the specified width or spacing specification based on an average angle. The average angle can be an average of respective angles formed between a respective CNN edge (connected to the respective node) and lines extending perpendicularly from the respective node relative to each topological skeleton edge connected to the respective node. To create a scaled amount for a given PTS node and a given STS node connected by a given CNN edge, topological skeleton edges connected to the given node are identified, and perpendicular lines extending from the given node, each extending perpendicular to a respective one of the identified topological skeleton edges, are determined. Angles between the perpendicular lines and the given CNN edge connected to the given node are then determined and averaged to obtain the average angle $\bar{\theta}$. The scaled amount is the inverse of the cosine of the average angle $\bar{\theta}$ (e.g., $(\cos(\bar{\theta}))^{-1}$). Hence, in some examples, the distance for a PTS node (given a CNN edge that is connected to the PTS node) is half of the specified width of the initial polygon that is associated with the PTS node divided by the cosine of an average angle $\bar{\theta}$, and the distance for a STS node (given a CNN edge that is connected to the STS node) is half of the spacing specification divided by the cosine of an average angle $\bar{\theta}$. In some examples, such a scaled amount for any distance can be omitted, such as where a difference between a corresponding distance with and without scaling is insignificant or otherwise results in insignificant errors in the optimization process.

In some examples, the overlap includes a perpendicular overlap component for the PTS node of a given CNN edge and a perpendicular overlap component for the STS node of a given CNN edge. For a given CNN edge in some examples, a magnitude of overlap is the overlap of the distance for the PTS node extending from the PTS node projected onto the given CNN edge and the distance for the STS node extending from the STS node projected onto the given CNN edge. More simply, when the sum of the distance for the PTS node and the distance of the STS node exceeds the length of the given CNN edge, the magnitude of overlap is the difference between (i) the sum of the distance for the PTS node and the distance of the STS node and (ii) the length of the given CNN edge. If the sum of the distance for the PTS node and the distance of the STS node does not exceed the length of the given CNN edge, the magnitude of overlap is zero. A perpendicular overlap component for a given node of a given CNN edge is the magnitude of overlap times cosine of the average angle $\bar{\theta}$ of the given node for the given CNN edge. The overlap for a given CNN edge can, in some formulations, be a sum of the perpendicular overlap component for the PTS node connected to the CNN edge and the perpendicular overlap component for the STS node connected to the CNN edge. In such formulations, the overlap may, to some extent, double count some magnitude of overlap; however, since any such double counting is global in the formulation, the formulation may still render an appropriate result. In other examples, some proportioning can occur in a formulation. In some examples, the overlap can be the magnitude of overlap, such as where a difference between a magnitude of overlap and any perpendicular overlap component is insignificant or otherwise results in insignificant errors in the optimization process.

FIGS. 5A and 5B are simplified illustrations to show aspects of determining distances and overlap. FIGS. 5A and 5B show PTS edges 402-1, 402-2 of an initial PTS, STS edges 404-1, 404-2, 404-3, 404-4 of an STS, a PTS node 412 of the initial PTS and connected to the PTS edges 402-1, 402-2, and STS nodes 414-1, 414-2, 414-3 connected to respective STS edges 404-1, 404-2, 404-3, 404-4.

FIG. 5A shows CNN edges 416-1, 416-2, 416-3 of a CNN. The CNN edge 416-1 is connected to and between PTS node 412 and STS node 414-1. The CNN edge 416-2 is connected to and between PTS node 412 and STS node 414-2. The CNN edge 416-3 is connected to and between PTS node 412 and STS node 414-3.

FIG. 5A further depicts average angles $\bar{\theta}$ 422-1, 422-2, 422-3, 424-1, 424-2, 424-3. Average angle $\bar{\theta}$ 422-1 is the average of (i) an angle formed by the CNN edge 416-1 and a line extending from PTS node 412 perpendicular to PTS edge 402-1, and (ii) an angle formed by the CNN edge 416-1 and a line extending from PTS node 412 perpendicular to PTS edge 402-2. Average angle $\bar{\theta}$ 422-2 is the average of (i) an angle formed by the CNN edge 416-2 and a line extending from PTS node 412 perpendicular to PTS edge 402-1, and (ii) an angle formed by the CNN edge 416-2 and a line extending from PTS node 412 perpendicular to PTS edge 402-2. Average angle $\bar{\theta}$ 422-3 is the average of (i) an angle formed by the CNN edge 416-3 and a line extending from PTS node 412 perpendicular to PTS edge 402-1, and (ii) an angle formed by the CNN edge 416-3 and a line extending from PTS node 412 perpendicular to PTS edge 402-2.

Average angle $\bar{\theta}$ 424-1 is the average of (i) an angle formed by the CNN edge 416-1 and a line extending from STS node 414-1 perpendicular to STS edge 404-1, and (ii) an angle formed by the CNN edge 416-1 and a line extending from STS node 414-1 perpendicular to STS edge 404-2. Average angle $\bar{\theta}$ 424-2 (which is shown in additional detail by inset 430) is the average of (i) an angle 424-21 formed by the CNN edge 416-2 and a line 432-1 extending from STS node 414-2 perpendicular to STS edge 404-2, and (ii) an angle 424-22 formed by the CNN edge 416-2 and a line 432-2 extending from STS node 414-2 perpendicular to STS edge 404-3. Average angle $\bar{\theta}$ 424-3 is the average of (i) an angle formed by the CNN edge 416-3 and a line extending from STS node 414-3 perpendicular to STS edge 404-3, and (ii) an angle formed by the CNN edge 416-3 and a line extending from STS node 414-3 perpendicular to STS edge 404-4. The inset 430 is provided to illustrate detail of an average angle $\bar{\theta}$, and a person having ordinary skill in the art will readily understand the applicability of such detail for other nodes and edges.

FIG. 5B shows distances 442-1, 442-2, 442-3 extending from the PTS node 412 projected onto the CNN edges 416-1, 416-2, 416-3, respectively; distances 444-1, 444-2, 444-3 extending from STS nodes 414-1, 414-2, 414-3 projected onto the CNN edges 416-1, 416-2, 416-3, respectively; and magnitude of overlap 446-1, 446-2. The distance 442-1 extending from the PTS node 412 is defined as half of the specified width of the initial polygon represented by PTS edge 402-1 (and the PTS node 412) divided by the cosine of the average angle $\bar{\theta}$ 422-1. The distance 442-2 extending from the PTS node 412 is defined as half of the specified width of the initial polygon represented by PTS edge 402-1 (and the PTS node 412) divided by the cosine of the average angle $\bar{\theta}$ 422-2. The distance 442-3 extending from the PTS node 412 is defined as half of the specified width of the initial polygon represented by PTS edge 402-2 (and the PTS node 412) divided by the cosine of the average angle $\bar{\theta}$ 422-3. The distance 444-1 extending from STS node 414-1 is defined as half of the spacing specification divided by the cosine of the average angle $\bar{\theta}$ 424-1. The distance 444-2 extending from STS node 414-2 is defined as half of the spacing specification divided by the cosine of the average angle $\bar{\theta}$ 424-2. The distance 444-3 extending from STS node 414-3 is defined as half of the spacing specification divided by the cosine of the average angle $\bar{\theta}$ 424-3. As can be seen from FIG. 5B, the differences between average angle $\bar{\theta}$ 422-1 and average angle $\bar{\theta}$ 422-2 results in the distance 442-1 having a larger scaled amount than the distance 442-2.

Magnitude of overlap 446-1 is the overlap of distance 442-1 and distance 444-1 projected onto CNN edge 416-1. Magnitude of overlap 446-2 is the overlap of distance 442-2 and distance 444-2 projected onto CNN edge 416-2. No overlap of distance 442-3 and distance 444-3 exists.

For CNN edge 416-1, a perpendicular overlap component for PTS node 412 is the magnitude of overlap 446-1 times cosine of the average angle $\bar{\theta}$ 422-1, and a perpendicular overlap component for STS node 414-1 is the magnitude of overlap 446-1 times cosine of the average angle $\bar{\theta}$ 424-1. The overlap for the CNN edge 416-1 is a sum of the respective perpendicular overlap components for PTS node 412 and STS node 414-1.

For CNN edge 416-2, a perpendicular overlap component for PTS node 412 is the magnitude of overlap 446-2 times cosine of the average angle $\bar{\theta}$ 422-2, and a perpendicular overlap component for STS node 414-2 is the magnitude of overlap 446-2 times cosine of the average angle $\bar{\theta}$ 424-2. The overlap for the CNN edge 416-2 is a sum of the respective perpendicular overlap components for PTS node 412 and STS node 414-2.

With the CNN edges and the overlap, if any, for each CNN edge of the CNN defined, a minimization function can be performed on the cost function. The cost function is the sum of the overlap for all CNN edges of the CNN. The minimization function can be performed until an end condition of the minimization function is obtained. Example end conditions include obtaining a minimum of the cost function and/or the minimization function timing out without a solution. A minimum of the cost function can be determined by the minimization function. Performing the minimization function can include minimizing the cost function by performing a transformation on the PTS, such as by perturbing PTS nodes of the PTSs as permitted by constraints or lack of constraints. Perturbing the PTS nodes affects the cost function based on the definition of the cost function. The minimization function can be a gradient descent algorithm or other algorithm. In some examples, the cost function can have multiple minima. In some examples, performance of the minimization function can determine any of the multiple minima (e.g., some individual local minima), which may be other than a global minimum, or can determine a global minimum. Perturbing PTS nodes of the PTSs can result in a modification of STS(s), which may be different or modified from previous STS(s).

The generation of the cost function CFG can be mathematically expressed as shown below.

n is a CNN edge in a set N of CNN edges that form the CNN, n∈N;
$l_n$ is a length of a given CNN edge n;
$p_n$ is a PTS node of the PTSs connected to a given CNN edge n;
$e_{p|n}$ is a PTS edge in a set $E_{p|n}$ of PTS edges connected to PTS node $p_n$, $e_{p|n} \in E_{p|n}$;

$\theta_{e|(p|n)}$ is an angle formed between a given CNN edge n and a line perpendicular to PTS edge $e_{p|n}$;
$\bar{\theta}_{p|n}$ is an average of angles $\theta_{e|(p|n)}$ for PTS node $p_n$, $\bar{\theta}_{p|n}$=Average($\theta_{e|(p|n)}$), $\forall e_{p|n} \in E_{p|n}$);
$s_n$ is a STS node of the STS(s) connected to a given CNN edge n;
$e_{s|n}$ is a STS edge in a set $E_{s|n}$ of STS edges of the STSs connected to STS node $s_n$, $e_{s|n} \in E_{s|n}$;
$\theta_{e|(s|n)}$ is an angle formed between a given CNN edge n and a line perpendicular to STS edge $e_{s|n}$ and;
$\bar{\theta}_{s|n}$ is an average of angles $\theta_{e|(s|n)}$ for STS node $s_n$, $\bar{\theta}_{s|n}$=Average($\theta_{e|(s|n)}$), $\forall e_{s|n} \in E_{s|n}$);
$d_{p|n}$ is a distance of PTS node $p_n$ extending from PTS node $p_n$ projected onto a given CNN edge n;
$d_{s|n}$ is a distance of STS node $s_n$ extending from STS node $s_n$ projected onto a given CNN edge n;
$w_{e|(p|n)}$ is a specified width of the polygon represented by PTS edge $e_{p|n}$ and/or PTS node $p_n$;
$c_{s|n}$ is a spacing dimension of a spacing specification for STS node $s_n$;
$O_{\perp(p|n)}$ is a perpendicular overlap component for PTS node $p_n$;
$O_{\perp(s|n)}$ is a perpendicular overlap component for STS node $s_n$; and
$O_n$ is an overlap of distance $d_{p|n}$ and distance $d_{s|n}$ for a given CNN edge n.

$$d_{p|n} = \frac{w_{e|(p|n)}}{2\cos(\bar{\theta}_{p|n})}, \forall n \in N \qquad \text{Eq. (1)}$$

$$d_{s|n} = \frac{c_{s|n}}{2\cos(\bar{\theta}_{s|n})}, \forall n \in N \qquad \text{Eq. (2)}$$

$$\left\{ \text{if } (d_{p|n} + d_{s|n}) > l_n, \begin{cases} O_{\perp(p|n)} = \left[(d_{p|n}+d_{s|n})-l_n\right]\cos(\bar{\theta}_{p|n}) \\ O_{\perp(s|n)} = \left[(d_{p|n}+d_{s|n})-l_n\right]\cos(\bar{\theta}_{s|n}) \\ O_n = O_{\perp(p|n)} + O_{\perp(s|n)} \\ O_n = \left[(d_{p|n}+d_{s|n})-l_n\right] \\ \left[\cos(\bar{\theta}_{p|n}) + \cos(\bar{\theta}_{s|n})\right] \\ \text{else } \{O_n = 0\} \end{cases} \right\} \qquad \text{Eq. (3)}$$

$\forall n \in N$ $$CFG = \sum_n^N O_n \qquad \text{Eq. (4)}$$

The above expressions can be simplified if it is assumed that $\cos(\bar{\theta}_{p|n})$ and $\cos(d_{s|n})$ each are approximately 1 for all n∈N, as indicated below. In such a situation, $\bar{\theta}_{p|n}$, $\hat{\theta}_{s|n}$, $O_{\perp(p|n)}$, and $O_{\perp(s|n)}$ (among others) are obviated.

$$d_{p|n} = \frac{w_{e|(p|n)}}{2}, \forall n \in N \qquad \text{Eq. (5)}$$

$$d_{s|n} = \frac{c_{s|n}}{2}, \forall n \in N \qquad \text{Eq. (6)}$$

$$\left\{ \begin{array}{l} \text{if } (d_{p|n} + d_{s|n}) > l_n, O_n = (d_{p|n}+d_{s|n})-l_n \\ \text{else } O_n = 0 \end{array} \right\}, \forall n \in N \qquad \text{Eq. (7)}$$

$$CFG = \sum_n^N O_n \qquad \text{Eq. (8)}$$

Figure 6B:
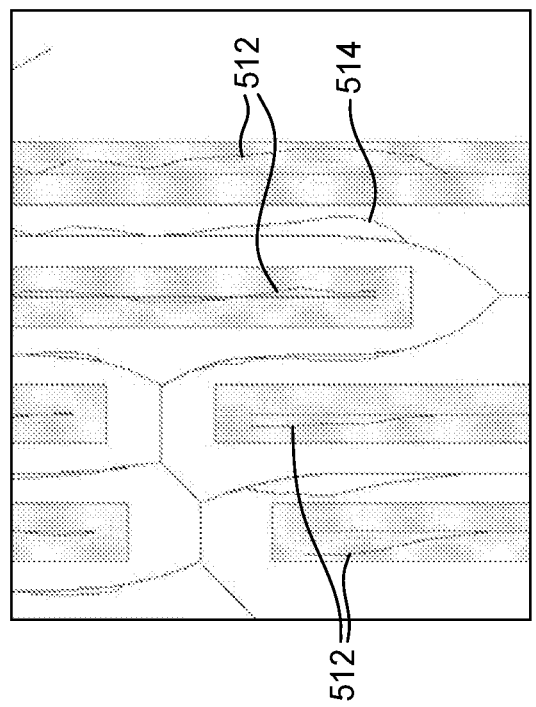
FIGS. 6A and 6B depict an example comparison between initial polygon and space topological skeletons and resulting polygon and space topological skeletons according to some examples.
Figure 6A:
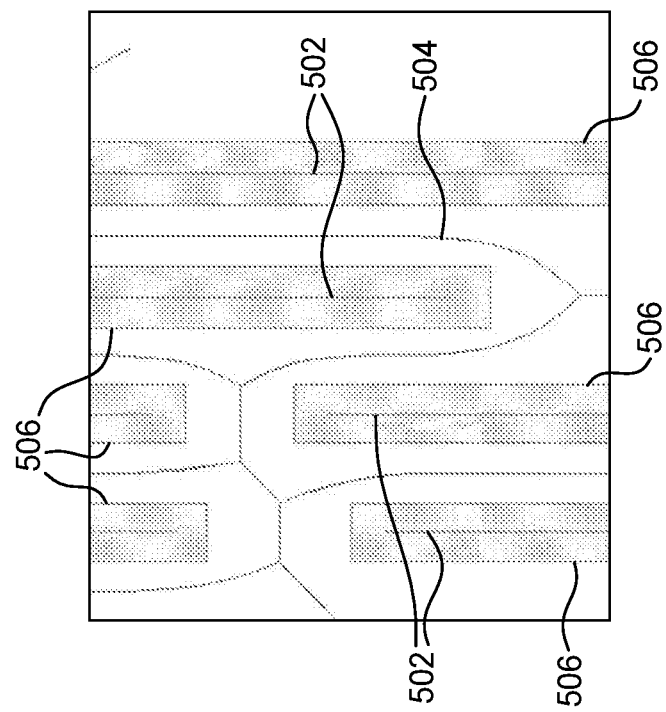

FIG. 6A depicts an example of initial PTSs 502 and STS 504, with initial polygons 506 depicted for reference. FIG. 6B depicts an example of resulting PTSs 512 and STSs 514. Performing the minimization function on the cost function causes the initial PTSs 502 and STSs 504 to be perturbed resulting in the resulting PTSs 512 and STSs 514 in this example.

Referring back to the example illustrated in FIGS. 3A-3F, FIG. 3E depicts resulting PTSs 212 after performing the minimization on the cost function (like in block 120 of FIG. 1). In this example, various unconstrained nodes have been moved or perturbed in the x-y plane of the metal layer Mx. Perturbed unidirectional constrained nodes 214 have been moved or perturbed in a Y-direction and not in an X-direction, while other unidirectional constrained nodes have not been moved or perturbed. The constrained location nodes have not been moved or perturbed. The PTS edges connected between PTS nodes remain connected to the same PTS nodes, and any perturbation or movement of a PTS node results in perturbation or movement of the PTS edge(s) connected to that PTS node. Perturbation of the initial PTSs 202 to the resulting PTSs 212 can be seen in this example by comparing FIG. 3C to FIG. 3E.

Referring back to the method 100 of FIG. 1, for completeness, it is worth noting that performing the minimization function on the cost function at block 120 may result in no PTS nodes being perturbed or moved. For example, no overlap may exist projected onto any CNN edge that was formed by the initial PTSs and the STS(s). Additionally, as another example, some overlap may exist projected onto CNN edges that were formed by the initial PTSs and the STS(s), but that overlap is such that the cost function is at, e.g., a local minimum. Hence, in these examples, the cost function would be at a (local) minimum without perturbing any PTS node of the initial PTSs. Accordingly, in some examples, the computer system performing the method 100 is configured to, in addition to performing a minimization function on the cost function, perturb or move PTS nodes of the PTSs, e.g., when doing so would minimize the cost function.

At block 122, optionally, the resulting PTSs are transformed into resulting polygons of features of the target layer. The resulting polygons are formed corresponding to lengths of respective PTS edges and specified widths associated with the connected PTS nodes. The resulting polygons represent features of the target layer, such as metal lines and/or vias in the target metal layer, of the design of the integrated circuit to be manufactured. Additionally, as an example, features for connections (e.g., vias) of any immediately underlying or overlying layer that correspond to unidirectional constrained nodes are perturbed or moved in the underlying or overlying layer in a way that corresponds with how the unidirectional constrained nodes were perturbed or moved, if any.

In some examples, block 122 can be omitted, such as where the resulting PTSs are to be subsequently processed (e.g., synthesized). In some examples, block 122 can be performed, and can create an electronic representation including the resulting polygons. Such an electronic representation can be an OASIS file, a GDS file, or the like. The electronic representation can be used in subsequent processing (e.g., synthesis) and/or can be used to fabricate one or more masks for manufacturing the integrated circuit on the semiconductor die.

Figure 3F:
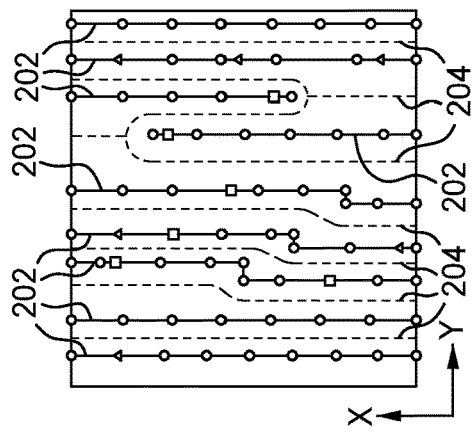

FIG. 3F shows the transformation of the resulting PTSs to the resulting polygons (like in block 122 of FIG. 1) in the illustrated example. Comparing FIG. 3A to FIG. 3F indicates the perturbations of the polygons of the metal layer Mx and polygons of metal layer M(x−1). Polygons 224 representing vias in metal layer M(x−1) were perturbed corresponding to the perturbation of the perturbed unidirectional constrained nodes 214 in FIG. 3E; no other polygons in metal layer M(x−1) were perturbed. The polygons of the metal layer M(x+1) were not perturbed.

A person having ordinary skill in the art will readily understand various data structures that may be implemented in the above process. For example, a class of node objects can be defined for nodes of the different topological skeletons, where each edge of the topological skeletons is logically indicated by a link to another connecting node within a respective node object. Similarly, a class of network objects can be defined for CNN edges of a CNN, where each network object indicates the PTS node of the PTS and the STS node of the STS that are connected. Different data structures and/or modified data structures can be used in different examples.

Additionally, a person having ordinary skill in the art will readily understand various modifications to the logical and/or mathematical expressions of examples described herein. For example, different angles can be identified and used for calculations, different calculations can be implemented for vector calculations, and the like. Other examples contemplate such modifications.

Figure 7:
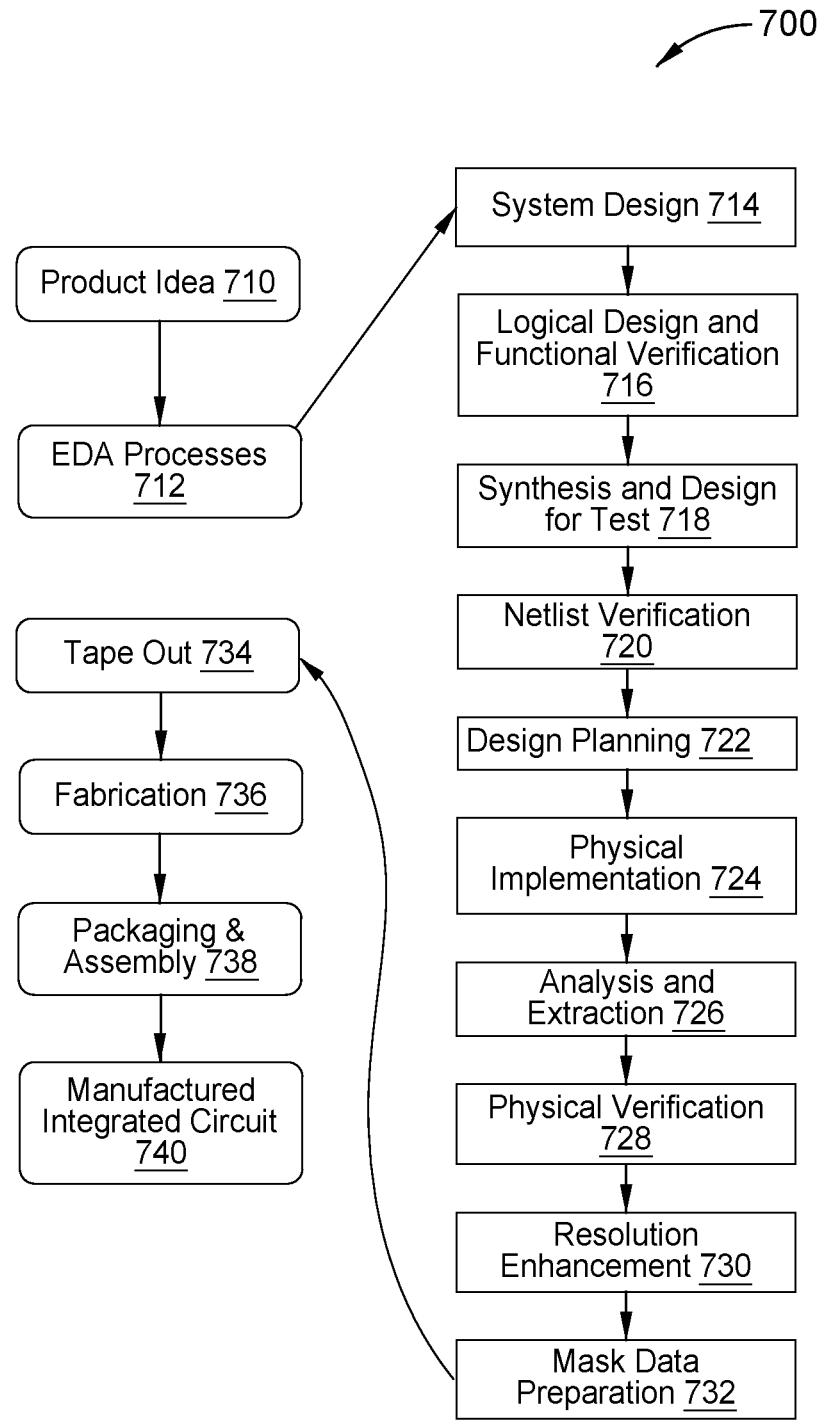
FIG. 7 depicts a flowchart of various processes used during the design and manufacture of an integrated circuit in accordance with some examples.

FIG. 7 illustrates an example set of processes 700 used during the design, verification, and fabrication of an integrated circuit on a semiconductor die to transform and verify design data and instructions that represent the integrated circuit. Each of these processes can be structured and enabled as multiple modules or operations. The term "EDA" signifies Electronic Design Automation. These processes start, at block 710, with the creation of a product idea with information supplied by a designer, information that is transformed to create an integrated circuit that uses a set of EDA processes, at block 712. When the design is finalized, at block 734, the design is taped-out, which is when artwork (e.g., geometric patterns) for the integrated circuit is sent to a fabrication facility to manufacture the mask set, which is then used to manufacture the integrated circuit. After tape-out, at block 736, the integrated circuit is fabricated on a semiconductor die, and at block 738, packaging and assembly processes are performed to produce, at block 740, the finished integrated circuit (oftentimes, also referred to as "chip" or "integrated circuit chip").

Specifications for a circuit or electronic structure may range from low-level transistor material layouts to high-level description languages. A high-level of abstraction may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower abstraction level that is a less abstract description adds more useful detail into the design description, such as, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described may be enabled by EDA products (or tools).

During system design, at block 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, at block 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some examples, special systems of components, referred to as emulators or prototyping systems, are used to speed up the functional verification.

During synthesis and design for test, at block 718, HDL code is transformed to a netlist. In some examples, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, at block 720, the netlist is checked for compliance with timing constraints and for correspondence with the HDL code. During design planning, at block 722, an overall floor plan for the integrated circuit is constructed and analyzed for timing and top-level routing.

During layout or physical implementation, at block 724, physical placement (positioning of circuit components, such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction, at block 726, the circuit function is verified at the layout level, which permits refinement of the layout design. During physical verification, at block 728, the layout design is checked to ensure that manufacturing constraints are correct, such as design rule check (DRC) constraints, electrical constraints, lithographic constraints, and that circuitry function matches the HDL design specification. During resolution enhancement, at block 730, the geometry of the layout is transformed to improve how the circuit design is manufactured. Resolution enhancement, at block 730 can include the method 100 for lithography-based optimization, which can be followed by synthesis, including optical proximity correction (OPC) or the like.

During tape-out, data is created to be used (after lithographic enhancements are applied if appropriate) for production of lithography masks. During mask data preparation, at block 732, the tape-out data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
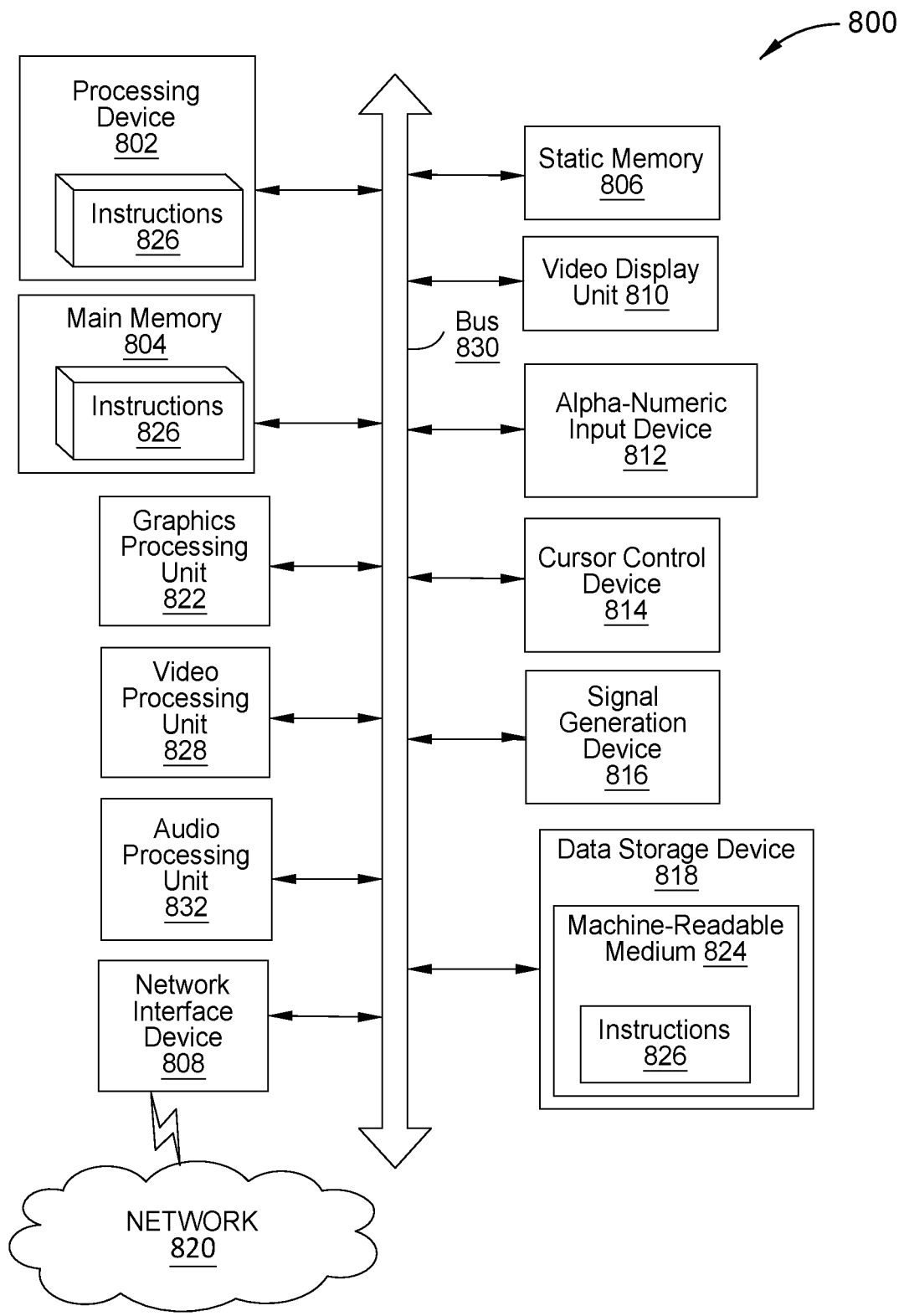
FIG. 8 depicts an abstract diagram of an example computer system in which examples of the present disclosure may operate.

FIG. 8 illustrates an example of a computer system 800 within which a set of instructions, for causing the computer system to perform any one or more of the methodologies discussed herein, including the method 100 of FIG. 1 and/or block 730 of FIG. 7, may be executed. In some implementations, the computer system may be connected (e.g., networked) to other machines in a local area network (LAN), an intranet, an extranet, and/or the Internet. The computer system may operate in the capacity of a server or a client machine in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term a computer system shall also be taken to include any collection of computer systems that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830. The main memory 804 includes or is a non-transitory computer readable medium. The main memory 804 (e.g., a non-transitory computer readable medium) can store one or more sets of instructions 826, that when executed by the processing device 802, cause the processing device 802 to perform some or all of the operations, steps, methods, and processes described herein, including the method 100 of FIG. 1 and/or block 730 of FIG. 7.

Processing device 802 represents one or more processors such as a microprocessor, a central processing unit, or the like. More particularly, the processing device 802 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 802 may also be one or more special-purpose processing devices such as an ASIC, an FPGA, a digital signal processor (DSP), network processor, or the like. The processing device 802 may be configured to execute instructions 826 for performing some or all of the operations, steps, methods, and processes described herein, including the method 100 of FIG. 1 and/or block 730 of FIG. 7.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (e.g., a non-transitory computer-readable medium) on which is stored one or more sets of instructions 826 or software embodying any one or more of the methodologies or functions described herein, including the method 100 of FIG. 1 and/or block 730 of FIG. 7. The instructions 826 may also reside, completely or at least partially, within the main memory 804 and/or within the processing device 802 during execution thereof by the computer system 800, the main memory 804 and the processing device 802 also including machine-readable storage media.

In some implementations, the instructions 826 include instructions to implement functionality described above. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 802 to perform any one or more of the methodologies described above. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   obtaining an electronic representation of a design of an integrated circuit to be manufactured on a semiconductor die, the design of the integrated circuit including layers, the electronic representation including initial polygons in a target layer of the layers;
   generating polygon topological skeletons of the initial polygons of the target layer;
   generating a space topological skeleton in a space between the polygon topological skeletons;
   generating a connected network comprising network edges, each network edge being connected between a respective polygon topological skeleton and the space topological skeleton; and
   performing, by one or more processors, a transformation of the polygon topological skeletons based on the network edges of the connected network, a spacing specification for a spacing between polygons, and respective specified widths associated with the initial polygons by perturbing the polygon topological skeletons.

2. The method of claim 1, wherein generating the polygon topological skeletons includes generating first polygon topological skeleton (PTS) nodes connected by PTS edges based on the initial polygons of the target layer.

3. The method of claim 2, wherein generating the polygon topological skeletons includes:
deriving second PTS nodes from connections to one or more layers that are underlying or overlying the target layer, each second PTS node having a placement constraint relating to the corresponding one or more layers; and
inserting the second PTS nodes into the polygon topological skeletons, each second PTS node being connected by a respective one or more PTS edges to another PTS node.

4. The method of claim 3, wherein generating the polygon topological skeletons includes, after generating the first PTS nodes, inserting third PTS nodes into the polygon topological skeletons, each third PTS node being connected by a respective one or more PTS edges to another PTS node, the first PTS nodes and the third PTS nodes having no placement constraint within the target layer.

5. The method of claim 1, wherein:
the polygon topological skeletons include PTS nodes connected by PTS edges;
the space topological skeleton includes space topological skeleton (STS) nodes connected by STS edges; and
each network edge of the connected network is connected to a respective one of the PTS nodes and a respective one of the STS nodes.

6. The method of claim 5, wherein:
each PTS node has a specified width associated with a corresponding initial polygon of the target layer;
performing the transformation is included in performing a minimization function on a cost function, performing the minimization function on the cost function perturbs at least some of the PTS nodes when the cost function is not minimized; and
the cost function includes a sum of overlap of a respective polygon distance and a space distance projected onto each network edge, the respective polygon distance being based on the specified width of the PTS node to which the respective network edge is connected and projected onto the respective network edge from the PTS node to which the respective network edge is connected, the space distance being based on the spacing specification and projected onto the respective network edge from the STS node to which the respective network edge is connected.

7. The method of claim 1 further comprising, after performing the transformation of the polygon topological skeletons by perturbing the polygon topological skeletons, transforming the polygon topological skeletons to resulting polygons in the target layer.

8. A system comprising:
a memory storing instructions; and
one or more processors, coupled with the memory and configured to execute the instructions, wherein the instructions, when executed by the one or more processors, cause the one or more processors to:
generate polygon topological skeletons based on initial polygons of a target layer in an electronic representation of a design of an integrated circuit to be manufactured on a semiconductor die, the design of the integrated circuit including layers that include the target layer, the polygon topological skeletons including polygon topological skeleton (PTS) nodes connected by PTS edges;
generate a space topological skeleton based on a space region between the polygon topological skeletons, the space topological skeleton including space topological skeleton (STS) nodes connected by STS edges;
generate a connected-node network including network edges, each network edge being connected to a respective one PTS node and a respective one STS node; and
perform a minimization function on a cost function, performing the minimization function being configured to perturb the PTS nodes until an end condition of the minimization function is reached, the cost function being based on the network edges, a spacing specification for a spacing between polygons, and respective specified widths associated with the PTS nodes connected to the network edges.

9. The system of claim 8, wherein the PTS nodes include first PTS nodes generated based on the initial polygons of the target layer, the first PTS nodes having no placement constraint within the target layer.

10. The system of claim 9, wherein the PTS nodes include second PTS nodes each generated based on a connection to a layer underlying or overlying the target layer, each second PTS node having a placement constraint relating to the corresponding layer underlying or overlying the target layer.

11. The system of claim 10, wherein the PTS nodes include third PTS nodes arbitrarily inserted into the polygon topological skeletons, the third PTS nodes having no placement constraint within the target layer.

12. The system of claim 8, wherein each PTS node has a specified width associated with a corresponding initial polygon of the target layer.

13. The system of claim 12, wherein the cost function includes a sum of overlap of a respective polygon distance and a space distance projected onto each network edge, the respective polygon distance being based on the specified width of the PTS node to which the respective network edge is connected and projected onto the respective network edge from the PTS node to which the respective network edge is connected, the space distance being based on the spacing specification and projected onto the respective network edge from the STS node to which the respective network edge is connected.

14. The system of claim 8, wherein the instructions, when executed by the one or more processors, further cause the one or more processors to:
after performing minimization function, transform the polygon topological skeletons to resulting polygons in the target layer.

15. A non-transitory computer readable medium comprising stored instructions, which when executed by one or more processors, cause the one or more processors to:
generate polygon topological skeletons based on initial polygons of a target layer in an electronic representation of a design of an integrated circuit, the design of the integrated circuit including layers that include the target layer, the polygon topological skeletons including polygon topological skeleton (PTS) nodes;

generate a space topological skeleton between the polygon topological skeletons, the space topological skeleton including space topological skeleton (STS) nodes;

generate a connected-node network including network edges, each network edge being connected to a respective one PTS node and a respective one STS node; and perform a minimization function on a cost function configured to perturb the PTS nodes until an end condition of the minimization function is obtained, the cost function including a sum of overlap of a respective polygon distance and a space distance projected onto each network edge, the respective polygon distance being based on a specified width associated with the PTS node to which the respective network edge is connected and projected onto the respective network edge from the PTS node to which the respective network edge is connected, the space distance being based on a spacing specification and projected onto the respective network edge from the STS node to which the respective network edge is connected.

16. The non-transitory computer readable medium of claim 15, wherein the PTS nodes include first PTS nodes generated based on the initial polygons of the target layer.

17. The non-transitory computer readable medium of claim 16, wherein the PTS nodes include second PTS nodes each generated based on a connection to a respective layer underlying or overlying the target layer.

18. The non-transitory computer readable medium of claim 17, wherein the PTS nodes include third PTS nodes arbitrarily inserted into the polygon topological skeletons.

19. The non-transitory computer readable medium of claim 18, wherein the first PTS nodes and third PTS nodes have no placement constraint within the target layer, and each second PTS node has a placement constraint relating to the corresponding layer underlying or overlying the target layer.

20. The non-transitory computer readable medium of claim 15, wherein the stored instructions, which when executed by the one or more processors, further cause the one or more processors to:

after performing the minimization function, transform the polygon topological skeletons to resulting polygons in the target layer based on respective specified widths associated with the PTS nodes.

* * * * *